United States Patent [19]

Brück et al.

[11] Patent Number: 5,994,483
[45] Date of Patent: Nov. 30, 1999

[54] PROCESS FOR PREPARING POLYMER BLENDS BY RECYCLING HIGH-PERFORMANCE POLYMERS

[75] Inventors: Martin Brück, Weilrod; Stefan Disch, Frankfurt; Klaus Kohlhepp, Eppstein, all of Germany

[73] Assignee: Ticona GmbH, Germany

[21] Appl. No.: 09/133,126

[22] Filed: Aug. 12, 1998

[30] Foreign Application Priority Data

Aug. 12, 1997 [DE] Germany .................... 197 34 850

[51] Int. Cl.[6] .................................................. C08G 63/00
[52] U.S. Cl. .............................. 526/67; 526/71; 528/176
[58] Field of Search ............................. 528/176, 480; 526/67, 71

[56] References Cited

U.S. PATENT DOCUMENTS 3,947,526   3/1976   Bacskai ..................... 528/176
4,016,106   4/1977   Sawyer et al. ............. 423/628

FOREIGN PATENT DOCUMENTS 44 36 636   4/1996   Germany .

OTHER PUBLICATIONS

Database WPI, Week 9225, Derwent Publications Ltd., London, GB & JP 04 132766 A (Dainippon Ink & Chem KK).

*Primary Examiner*—Terressa Mosley-Boykin
*Attorney, Agent, or Firm*—Connolly Bove Lodge & Hutz

[57] ABSTRACT

The invention relates to a process for preparing blends of high-performance polymers. The particular features are that at least two single-type polymers are treated with a solvent or a solvent mixture in which the polymers used are soluble, the polymers are thereby dissolved, and are then precipitated in a liquid medium, and recycled material is used for each of the polymeric constituents.

10 Claims, No Drawings

PROCESS FOR PREPARING POLYMER BLENDS BY RECYCLING HIGH-PERFORMANCE POLYMERS

The invention relates to a process for preparing polymer blends from waste material, using high-performance polymers.

Polyarylene sulfides (PASs) and their preparation are known (U.S. Pat. No. 3,354,129). During their preparation, PASs are isolated from the reaction mixture by conventional methods.

High-performance polymers can be remelted as waste material and reintroduced in the form of regrind to the injection molding process. However, it is known that this impairs product properties. For example, DE-A-3433978, in the prior art, mentions that repeated thermal stressing of PAS results in too little or too much crosslinking and, in the case of linear PAS starting materials, this causes impairment of flow properties and of toughness.

There is a known process for recycling—i.e. recovering—PAS (DE-A-44 36 636). In this process, material which comprises polyarylene sulfide, i.e. recycled material, for example from wastes, or material intended for re-use, is treated with a solvent, thereby dissolving the polymer, and the solution is filtered in order to remove any insoluble constituents which may be present, and precipitated in a liquid medium. The properties of PAS obtained in this process are at least identical with those of fresh PAS material which has not yet been processed, and in some cases are even improved. Due to the precipitation process, the PAS material obtained in this way generally comprises a smaller amount of low-molecular-weight contamination than does the starting material. However, the known process is based solely on PAS as sole component, and not on mixtures with other polymers.

A mixture of two or more polymers which is generally shaped by thermoplastic means is termed a polymer blend. In industry, such polymer blends are mostly prepared by mixing the polymeric components, followed by melting, e.g. in a kneader or extruder (see e.g. S. Akhtar, J. L. White, Polymer Engineering and Science, Vol. 31, pp. 84–91, 1991). This method of preparing polymer blends has the disadvantage that all of the contamination and other substances present in the starting materials remain in the blend produced. There is, furthermore, the possibility of damage to the polymer molecules by the high shear in the extruder. In blending by extrusion, the operation has to be carried out at a temperature which is above the melting point of the higher-melting polymer. At this temperature, however, one or other of the polymers may become thermally degraded. In addition, this process permits only inadequate control of the properties of the polymer blend.

However, it is also possible to prepare a polymer blend via a solution and precipitation procedure, which can avoid the abovementioned thermal degradation of the blend components.

There are known blends of PAS and a thermoplastic polyether made from bisphenol A and epichlorohydrin, which are prepared from a solution of the two polymers (JP 02-222449-A). The resultant resin-like component is extruded with other thermoplastic resins, such as polyphenylene sulfide (PPS) and/or polyphenylene oxide (PPO), polyether sulfone (PES), polyether ketone (PEK), polyamide (PA) or others, and processed to give moldings. The presence of the blend portion in the mixture improves the mechanical properties of the resultant moldings, for example their impact strength and tensile strength. The blend therefore serves to increase the phase-miscibility of polymer mixture. No mention is made of recovery.

The separate preparation of a "preblend", as described above, can be avoided if PAS and phenoxy resins and/or other thermoplastic resins, such as PA, PPO, PEK and others, are dissolved in an organic solvent in the presence of an organic silane compound, and then precipitated in the solid state (JP 04-132 766A). The resultant mixture is melted, pelletized, and converted into moldings with excellent heat resistance, flame retardancy, chemical resistance, dimensional stability and processability, and also having increased mechanical resistance. The advantages are achieved by the presence of the silanes acting as compatibilizer. Here again, the solution procedure is not used to recover waste material.

However, a common feature of all of the known processes is that the polymers used are virgin material, and this has a considerable effect on the price of the final products.

It was an object of the invention to avoid disadvantages of the abovementioned processes and to develop cost-effective processes for preparing blends.

The invention relates to a process for preparing blends of high-performance polymers, by treating at least two single-type polymers with a solvent or solvent mixture in which the polymers used are soluble, thereby dissolving the polymers, and then precipitating them in a liquid medium, and using recycled material for each of the polymeric constituents.

The novel process may also use a blend of known composition instead of the single-type polymers.

The invention also relates to the use of the polymer blends recovered by the process as engineering plastics for producing moldings.

Polymer blends are generally used in cases where the properties of the individual high-performance polymers are inadequate for particular application sectors. For example, the impact strength and flexibility of PPS is improved by mixing with, for example, PES, while the good properties of the PPS, such as high heat resistance, chemical resistance and flame retardancy, are retained. This is why such polymer blends can be shaped, e.g. by spraying, compression molding, injection molding and thermoforming, to produce moldings used, for example, in automotive construction or the electronics and electrical industries. Examples of these are heat exchangers, pumps and insulating materials.

It was surprising that it is technically possible to obtain the advantages mentioned of the polymer blends even with recycled material, and to use the blends for the known application sectors without losses in quality.

Examples of suitable polymers which are used in the novel process are PAS, polyether ketone, polyetherether ketone (PEEK), polyetherimide (PEI), polyphenylene oxide (PPO), polycarbonate (PC), cycloolefin copolymer (COC) and polyether sulfone (PES). It is preferable for PAS always to be a component of the blend. These polymers are used in the form of recycled material, i.e. waste material, such as wastes from processing the polymers, or also polymer material which has been collected for recovery, for example used parts from equipment which is no longer operable, powder, granules, waste from shaping procedures and other processed polymer moldings. The recycled material may be polymer blended with fillers and/or with reinforcing materials, or polymer which has not been blended in this way.

All of the polymers mentioned may be recovered from their solutions without loss of their physical properties, and the properties are even improved in many cases, this being related to the purity of the recovered materials. The novel process is therefore an advantageous use of recycled material, i.e. of material intended for reuse. Another advantage is that the valuable properties mentioned are also retained during recovery if there is a mixture of polymers. In this case, in order to determine the exact ratio of the polymers to one another in the recovered mixture, it is necessary to use single-type recycled material of the individual polymers. It is also possible to use recycled material from a blend of known composition, in which case only the soluble components are recovered.

In the novel process, :he waste material, which comprises, for example, PAS and the other polymeric components to be recycled, is suspended in a high-boiling organic solvent or in a solvent mixture. On heating, the polymers dissolve out of the waste material. Insoluble constituents are removed by filtration. The polymer solution is introduced into a non-solvent, whereupon the polymers are precipitated as a blend. The polymer blend is filtered off with suction and dried.

The term "liquid medium" is to be understood as meaning water or an organic solvent in which, on the one hand, the polymers are insoluble, but which, on the other hand, dissolves low-molecular-weight oligomers and other contamination. Examples of those suitable for this purpose are acetone, ethanol, isopropanol, tetrahydrofuran (THF) and toluene.

The polymers are generally used either as unblended material or are present in mixtures with fillers, such as glass fibers and mineral substances. If polymeric material provided with fillers is used in the novel process, these insoluble, generally inorganic, constituents are separated off by filtration after the solution process. If there are also other substances in the polymeric material which are not dissolved in the solution procedure, these may likewise be removed by filtration.

After the solution procedure and after an additional filtration if desired, the polymers in the solution are obtained by precipitation or reprecipitation in a liquid medium. The liquid medium is present as an excess in a ratio of from 1:1 to 1:100, preferably from 1:10 to 1:15, based on each polymer (as solid) used, and the polymer solution is introduced into the liquid medium, for example with vigorous stirring. After the precipitation procedure, there is a process of one or more washes with fresh liquid medium, followed by drying.

Solvents which are used in the novel process are generally high-boiling and have boiling points of up to 400° C. Examples of these are monocyclic or polycyclic organic compounds having from 6 to 25 carbon atoms and unsubstituted or substituted with halogen, preferably chlorine or bromine, alkoxy groups having from 1 to 4 carbon atoms in the alkyl radical or aryl groups. These compounds may also have phenolic OH groups. Examples of suitable solvents are chlorobenzene, 1-chloro- and 1-bromonaphthalene, benzophenone and N-methylpyrrolidone (NMP) and mixtures of these.

The recycled materials are dissolved by treatment with the solvents at temperatures of from 150 to 360° C., preferably from 180 to 260° C. The resultant solution has low viscosity. The operation is generally carried out at atmospheric pressure. However, the polymeric material may also be dissolved at elevated pressure. In the latter mode of operation it is possible to dispense with the reprecipitation if the pressure of the solution is reduced by passing it through a nozzle, for example into a heated spray tower, producing a finely divided polymer powder. If the solution comprises solid constituents, these may be removed by a filtration procedure before the spray drying. If the operation is carried out under pressure and the solution is introduced into a heated spray tower which is under reduced pressure, the solvent may be removed as overhead product and condensed. The heat capacity of the solution is sufficient to give complete evaporation of, for example, chlorobenzene, so that there is only a limited requirement for additional drying.

If the polymer solution held under elevated pressure is allowed to reduce its pressure spontaneously on passing into a liquid medium, the result is, for example, fibrous aggregates. In addition, compared with spray drying, this method has an additional purifying effect.

The filtration process removes from the waste material substances which are present therein, such as glass fibers and mineral substances, fractions degraded by the action of the environment, and insoluble constituents resulting from ageing. The precipitation process, furthermore, removes those soluble contaminants which are not reprecipitated, so that the polymers made from waste material have a purity which equals or even exceeds that of virgin-quality polymer material.

Both the microscopic and the macroscopic nature of the particles obtained from the precipitation can be influenced by varying the parameters of the process. Macroscopic nature is taken to mean the shape of the particles. The size of the precipitated particles is from 100 nm to 10 mm.

For example, flaky structures are obtained by, as described, dropwise addition of the polymer solution with vigorous stirring. In contrast, if the solution is added dropwise into a medium which is static, i.e. not set into motion, the result is a spherical shape. The size of the particles can be influenced via the concentration of the polymer solution. For example, relatively high concentration gives relatively large particles. The particle size may moreover be controlled by varying the precipitation medium and the temperature.

The microscopic nature of the polymer blend is a matter fundamentally different from the shape of the precipitated particles. The polymer components in a blend are generally present as separate phases, i.e. at a microscopic level the individual polymers are separated spatially. The arrangement of these areas of separate phases is termed the morphology. For polymer blends, a distinction is generally made between a continuous and a discontinuous phase. The latter is formed by the blend constituent present in subordinate amounts and generally has dimensions of from 1 nm to 50 µm.

In polymer blends produced by conventional pathways via extrusion, this morphology can be varied only within narrow limits by changing the extrusion temperature or the blend composition. This is a disadvantage of the conventional processes, since the mechanical properties important for the application depend very greatly on the morphology. The novel process has the advantage that, in contrast, the morphology of the blends can be varied over wide ranges. By varying the polymer composition, the rate of dropwise addition or introduction through the nozzle during precipitation, the non-solvent used for the precipitation, the temperature of the precipitation medium, the extent of mixing of the precipitation medium and the concentration of the polymers in the solution and in the precipitation medium, it is possible to adjust the morphology as desired. For example, the size of the areas of separate phases can be adjusted by varying the temperature of the precipitation medium and the shape of the areas of separate phases can be influenced by varying the extent of mixing of the precipitation medium during the precipitation procedure.

In addition, the crystallinity of the polymers in the blend may likewise be adjusted as desired. For example, rapid dropwise addition of the polymer solution into the non-solvent and a low temperature during this addition gives a low degree of crystallinity, whereas slow dropwise addition and a high temperature during the precipitation brings about a high degree of crystallinity.

The methods used to determine the properties of the blends are time sweep (time swp.), frequency sweep (freq. swp. in accordance with ISO FDIS 6721-10), melt viscosity in accordance with ASTM, D 3835 and glass transition temperature in accordance with ISO 6721, Parts 1+2, Method b.

EXAMPLES

Example 1

35 g of recycled PPS material and 15 g of recycled polyphenylene ether, in each case free from filler and reinforcing materials, were introduced into 200 g of chloronaphthalene (PPS/PPO ratio 70:30) and heated to 250° C. in an apparatus with stirrer, thermometer and condenser, whereupon the polymers dissolved completely after a residence time of 30 minutes at this temperature. The hot solution was then reprecipitated in 3 liters of cold acetone. The reprecipitation was carried out by dropwise addition of the polymer solution while the acetone was stirred. The resultant fibrous product was filtered off with suction and thoroughly washed with acetone. The purification procedure was completed by slurrying again in acetone and repeating the filtration with suction and washing, followed by drying at reduced pressure and 70° C., to constant weight. The results are given in Table 1. For the mechanical tests, the material was pelletized and injection molded.

Comparative Example 1

For comparison, a polymer blend was prepared by mixing virgin material in the melt via extrusion. For this, virgin material in the form of commercially available polymer material (®Fortron 205B4 (manufacturer Ticona GmbH, Frankfurt a.M., Germany) and ®Blendex HP820 (manufacturer GE Plastics) were ground and then the resultant powder was homogenized in a mixer in the weight ratios given above. The mixture was then introduced into an extruder and pelletized, and injection molded. The results are listed in Table 1.

Comparison reveals that the values from the blend prepared from recycled material are practically no different from those of virgin material.

TABLE 1

Injection molding program: 40 shots of tensile specimens (multipurpose tensile specimen) in accordance with ISO 3167 Bayer Mold, No. 8601/19 HT

| Test program | Property | Standard | Unit | Ex. 1 | Comp. Ex. 1 |
|---|---|---|---|---|---|
| Density measurement | Density | ISO 1183 | g/cm$^3$ | 1.3 | 1.3 |
| Tensile test | Ultimate tensile strength | ISO 527 | N/mm$^2$ | 60.4 | 63.1 |
|  | Elongation at break | ISO 527 | % | 2.1 | 2.3 |
|  | Tensile modulus of elasticity | ISO 527 | N/mm$^2$ | 3461.0 | 3229.0 |
| Flexural test | Flexural strength* | ISO 178 | N/mm$^2$ | 114.2 | 104.6 |
|  | Flexural strain** at break | ISO 178 | % | 3.8 | 3.4 |
|  | Flexural modulus of elasticity | ISO 178 | N/mm$^2$ | 3280.0 | 2967.0 |
|  | Flexural stress | ISO 178 | N/mm$^2$ | 109.8 | 89.9 |
| Charpy impact and notched impact strength tests | Charpy impact strength | ISO 179/1eU | mJ/mm$^2$ | 15.6 | 17.6 |
|  | Charpy notched impact strength | 179/1eA | mJ/mm$^2$ | 1.6 | 1.4 |

\* = breaking stress
\*\* = breaking strain

TABLE 2

Rheological Studies, Example 1
Comparison of PPS/PPO blend
(virgin material, mech. blend and solution blend)

|  | Melting point (Tm) | Recrystallization temp. Tc$_2$) | Time sweep 30 min | Frequency sweep 10 rad | Melt viscosity 310° C., 1200 s$^{-1}$ | Glass transition temp. (Tg) |
|---|---|---|---|---|---|---|
| Virgin material |  |  |  |  |  |  |
| PPS | 283.5° C. | 251.0° C. | 50.3 Pa.s | 75.9 Pa.s | — | 101.5° C. |
| PPO | 240.5° C. | — | — | — | — | 206.3° C. |
| Ex. 1 |  |  |  |  |  |  |
| PPS/PPO Ratio: 70:30 Pellets | 284.2° C. | 249.0° C. | 272.3 Pas | 294.7 Pas | 61.4 Pas |  |
| Comp. 1 |  |  |  |  |  |  |
| PPS/PPO Ratio: 70:30 Pellets | 281.7° C. | 241.3° C. | 142.5 Pas | 184.4 Pas | 107.4 Pas | 102.5° C. 208.3° C. |

Analysis of the optical microscopy clearly shows better homogeneous distribution of the blend constituent (Ex. 1) than in the mechanically prepared blend (Comp. Ex. 1). The image analysis carried out gave an average particle diameter of the polyphenylene ether blend constituent of about 1.8 μm in the case of the solution blend, with a narrow distribution of from 0.6 to 6.8 μm. Contrasting with the mechanical blend, the average particle diameter of PPO is >25 μm.

The results of the mechanical and rheological studies in Table 2 show that comparable values are achieved. This confirms that the solution blend process can produce virgin-material quality from recycled material. There is even a clear improvement in the homogeneous distribution of the blend constituent, and this was achieved via the novel process.

Example 2

5.8 kg of recycled PPS material comprising, as reinforcing component, 40% by weight of glass fibers, and 1.5 kg of recycled polyphenylene ether material without fillers were introduced into 20 kg of benzophenone, so that the PPS/PPO ratio is 70:30, and heated to 250° C. in an apparatus with stirrer, thermometer and condenser, whereupon the polymers dissolved completely after a residence time of 30 minutes at this temperature. The insoluble constituents, such as ageing products, contamination, glass fibers, etc., were then removed. The filter cake was then washed three times with, on each occasion, 2.5 l of benzophenone at a temperature of 250° C. The hot solution was then introduced into 250 l of acetone. The reprecipitation took place by introducing the polymer solution through a nozzle while the acetone was vigorously stirred. Using a vacuum filter, the product was filtered off with suction and washed thoroughly with acetone. The purification procedure was completed by slurrying again in acetone, and repeating the filtration with suction and washing, followed by drying at reduced pressure at 7° C., to constant weight. The resultant solution blend was pulverulent and was distinguished by a very low bulk density of 0.35 g/cm$^3$. The product was then compounded with (virgin) glass fiber.

Comparative Example 2

Here, too, a mechanical blend was prepared for comparison, by pelletizing recycled material of the polymers to correspond with the PPS/PPO mixing ratio of 70:30 given above. The PPS was reinforced with 40% of glass fiber.

The result of the mechanical testing was a 5% higher value measured for the tensile modulus of elasticity, and a 10% higher value measured for the flexural strength, of the solution blend tested compared with the mechanical blend which was prepared.

Example 3

700 g of a recycled material composed of 300 g of polyphenylene sulfide (PPS), 100 g of polyether sulfone (PES), 50 g of liquid-crystalline polymer (LCP) and 200 g of glass fibers were introduced into 2.5 kg of benzophenone and heated to 250° C. The treatment then proceeded as described in Example 2. The testing of the resultant material showed that this was a two-phase polymer blend composed of polyether sulfone and polyphenylene sulfide. The glass fiber content was <1% by weight. Analysis of the filter cake gave the following composition in percentages by weight:

glass fibers: 79.4%
LCP: 19.6%
PPS: 0.6%
PES: 0.4%

This shows that this process also gives the possibility of separating out particular high-performance polymers which are insoluble in the solvents used, and/or preparing polymer blends in a controlled manner.

Example 4

The polymer blend (solution blend) reprecipitated in Example 1 was again treated as in Example 1. The properties of the product were no different from those of the product from Example 1 (single treatment). There was therefore no impairment of properties.

Example 5

A recycled material (5 kg) which comprised PPS and PES in a ratio of 50:50 was treated as in Example 2 with 20 kg of benzophenone. The resultant blended product was shaped to give tensile specimens. For comparison, corresponding tensile specimens were prepared from virgin material as described in Comparative Example 1. The properties resulting from both tests are given in Table 3.

TABLE 3

Injection molding program: 40 shots of tensile specimens (multipurpose tensile specimen) in accordance with ISO 3167 Bayer Mold, No. 8601/19 HT

| Material Test program | Property | Standard | Unit | Mech. blend 50:50 | Solution blend 50:50 | PPS | PES |
|---|---|---|---|---|---|---|---|
| Density measurement | Density | ISO 1183 | g/cm$^3$ | 1.29 | 1.29 | 1.35 | 1.24 |
| Tensile test | Ultimate tensile strength | ISO 527 | N/mm$^2$ | 80.5 | 70.5 | 75.0 | — |
| (Test speed 5 mm/min) | Elongation at break | ISO 527 | % | 4.3 | 2.9 | — | 40–70 |
| | Tensile modulus of elasticity | ISO 527 | N/mm$^2$ | 3200 | 3184 | 3700 | 2700 |
| Flexural test | Flexural strength* | ISO 178 | N/mm$^2$ | [1)]130.8 | 131.31 | 130.0 | — |
| | Flexural strain** at break | ISO 178 | % | [2)]6.1 | 5.9 | — | — |
| | Flexural modulus of elasticity | ISO 178 | N/mm$^2$ | 2841 | 2876 | 3800 | — |
| Charpy impact and notched impact strength tests | Charpy impact strength | ISO 179/1eU | mJ/mm$^2$ | 56.7 | 46.9 | — | — |
| | Charpy notched impact strength | ISO 179/1eA | mJ/mm$^2$ | 3.5 | 3.4 | — | — |

\* = Flexural stress;
\*\* = Breaking strain;
[1)] = Flexural strength without fracture;
[2)] = Flexural strain without fracture;
[3)] = Taken from Forton product brochure, April 1996 issue;
[4)] = Taken from Ultrason product brochure, August 1990 issue.

We claim:

1. A process for preparing blends of high-performance polymers, which comprises treating at least two recycled single polymers with a solvent or solvent mixture in which the polymers used are soluble, thereby dissolving the polymers, and then precipitating them in a liquid medium, and using recycled material for each of the polymeric constituents, wherein one recycled polymer is a polyarylene sulfide and the solvent is chlorobenzene, 1-chloro- or 1-bromonaphthalene, benzophenone or N-methylpyrrolidone, individually or in a mixture, and wherein the liquid medium is selected from the group consisting of acetone, ethanol, isopropanol, tetrahydrofuran and toluene.

2. The process as claimed in claim 1, wherein the recycled polymers are selected from the group consisting of a polyarylene sulfide, polyether ketone, polyetherether ketone, polyetherimide, polyphenylene oxide, polycarbonate, cycloolefin copolymer and polyether sulfone.

3. The process as claimed in claim 1, wherein the recycled material is in the form of powder, granules, moldings or waste from shaping processes.

4. The process as claimed in claim 1, wherein the solvent is a monocyclic or polycyclic organic compound having from 6 to 25 carbon atoms and unsubstituted or substituted with halogen alkoxy groups having from 1 to 4 carbon atoms in the alkyl radical or aryl groups.

5. The process as claimed in claim 1, wherein the polymeric material is dissolved at a temperature of from 150 to 360° C.

6. The process as claimed in claim 5, wherein the material is dissolved at elevated pressure.

7. The process as claimed in claim 1, wherein the liquid medium is present in a ratio of from 1:1 to 1:100.

8. The process as claimed in claim 1, wherein the dissolved material is freed from insoluble solids before the precipitation procedure.

9. The process as claimed in claim 1, wherein the polymer blends precipitated have various shapes.

10. The process as claimed in claim 1, wherein the polymer blends precipitated have various morphologies.

* * * * *

UNITED STATES PATENT AND TRADEMARK OFFICE
CERTIFICATE OF CORRECTION

PATENT NO. : 5,994,483
DATED : November 30, 1999
INVENTOR(S) : Martin Bruck, et al.

It is certified that error appears in the above-identified patent and that said Letters Patent is hereby corrected as shown below:

Column 7, line 33, "7°C" should read - - 70°C - -.

Signed and Sealed this

Eleventh Day of July, 2000

Attest:

Q. TODD DICKINSON

*Attesting Officer*    *Director of Patents and Trademarks*